Jan. 23, 1962 R. I. VAN HOUTEN 3,017,703
MEASURING HELICAL LEADS
Filed Aug. 27, 1959 4 Sheets-Sheet 1
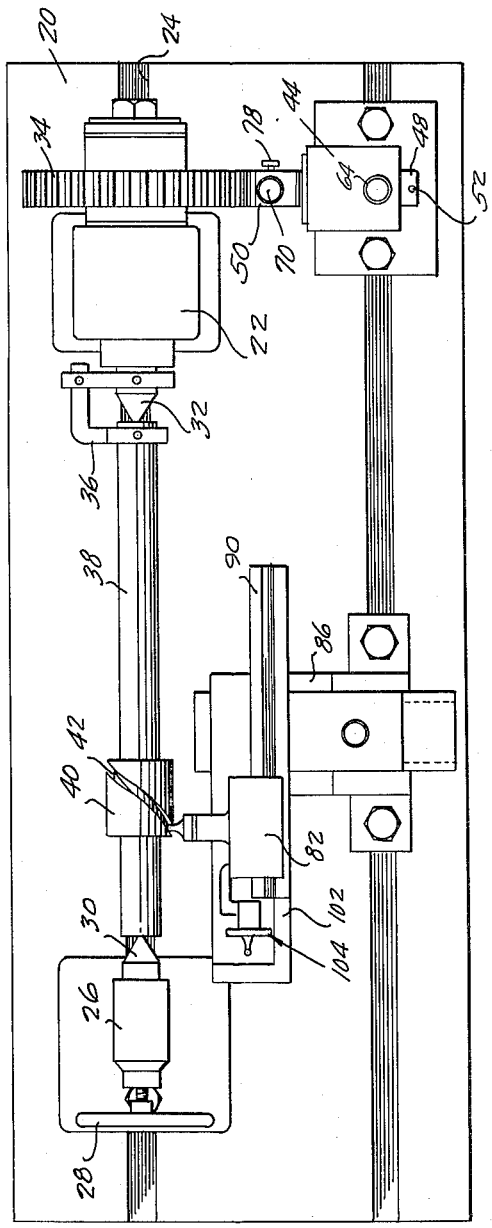
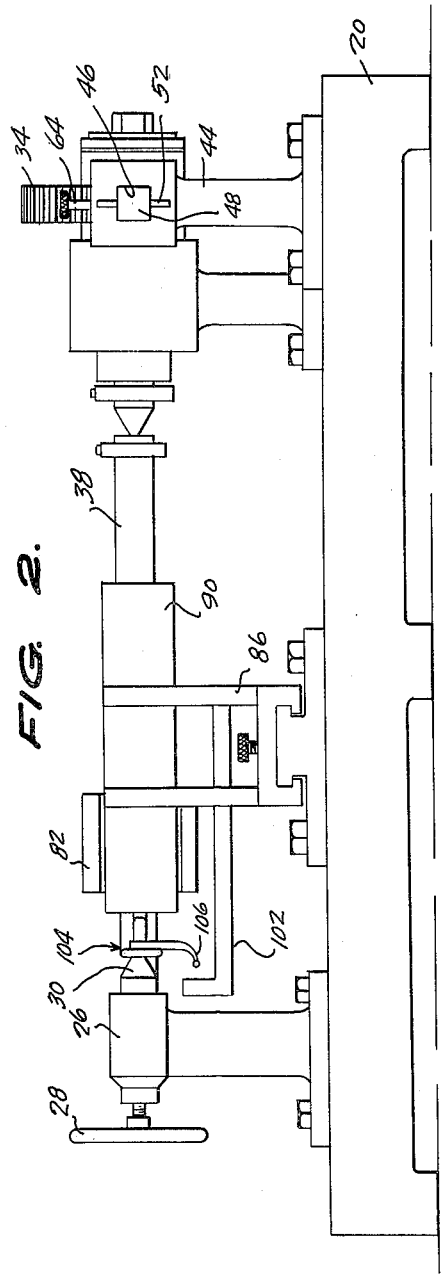
INVENTOR.
RUSSELL I. VAN HOUTEN,
BY
McMorrow, Berman & Davidson
ATTORNEYS.

Jan. 23, 1962   R. I. VAN HOUTEN   3,017,703
MEASURING HELICAL LEADS
Filed Aug. 27, 1959   4 Sheets-Sheet 2
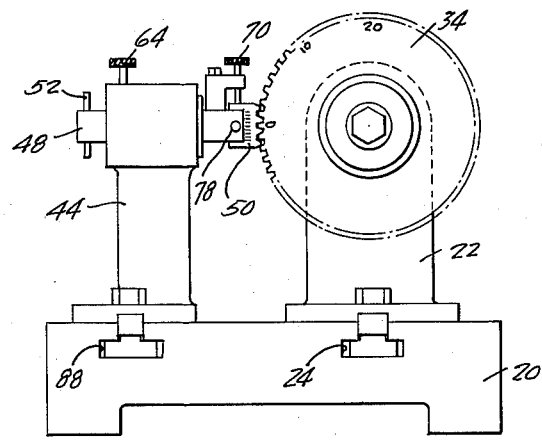
FIG. 3.
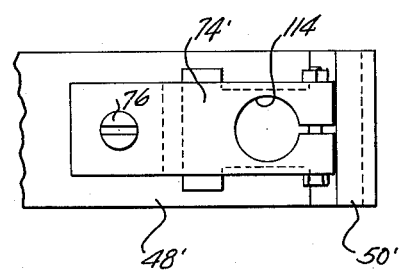
FIG. 11.
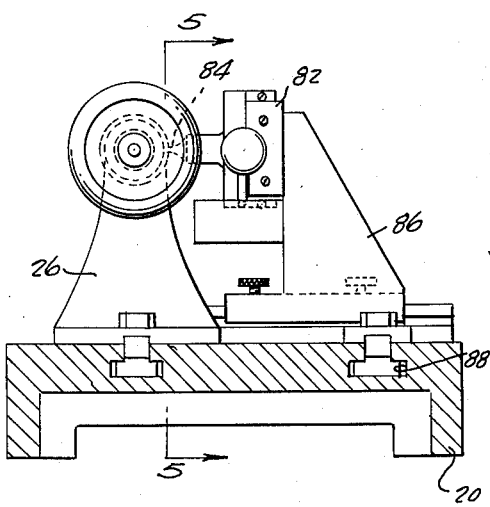
FIG. 4.
FIG. 10.
INVENTOR.
RUSSELL I VAN HOUTEN,
BY
McMorrow, Berman + Davidson
ATTORNEYS.

FIG. 5.
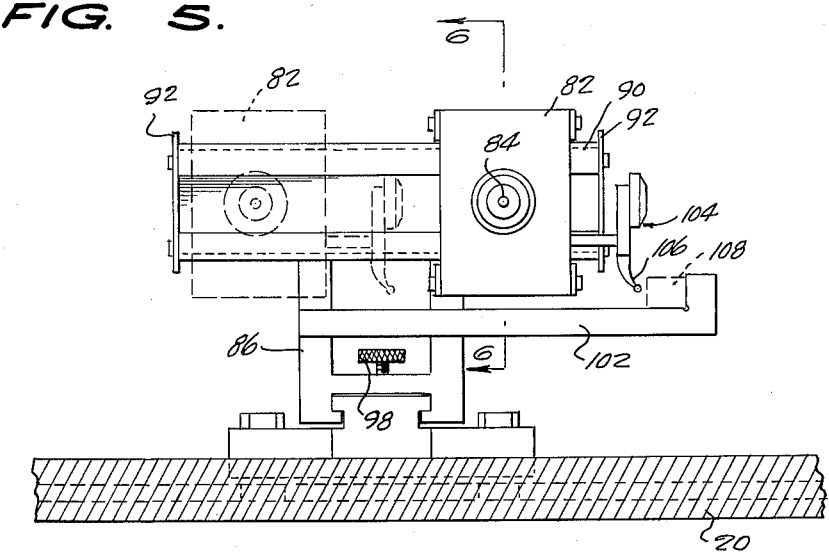
FIG. 6.
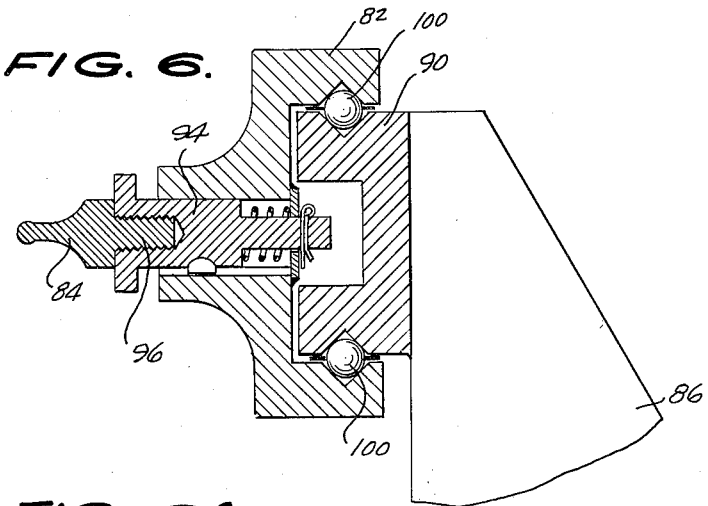
FIG. 6.A
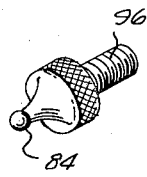

Jan. 23, 1962   R. I. VAN HOUTEN   3,017,703
MEASURING HELICAL LEADS
Filed Aug. 27, 1959   4 Sheets-Sheet 4
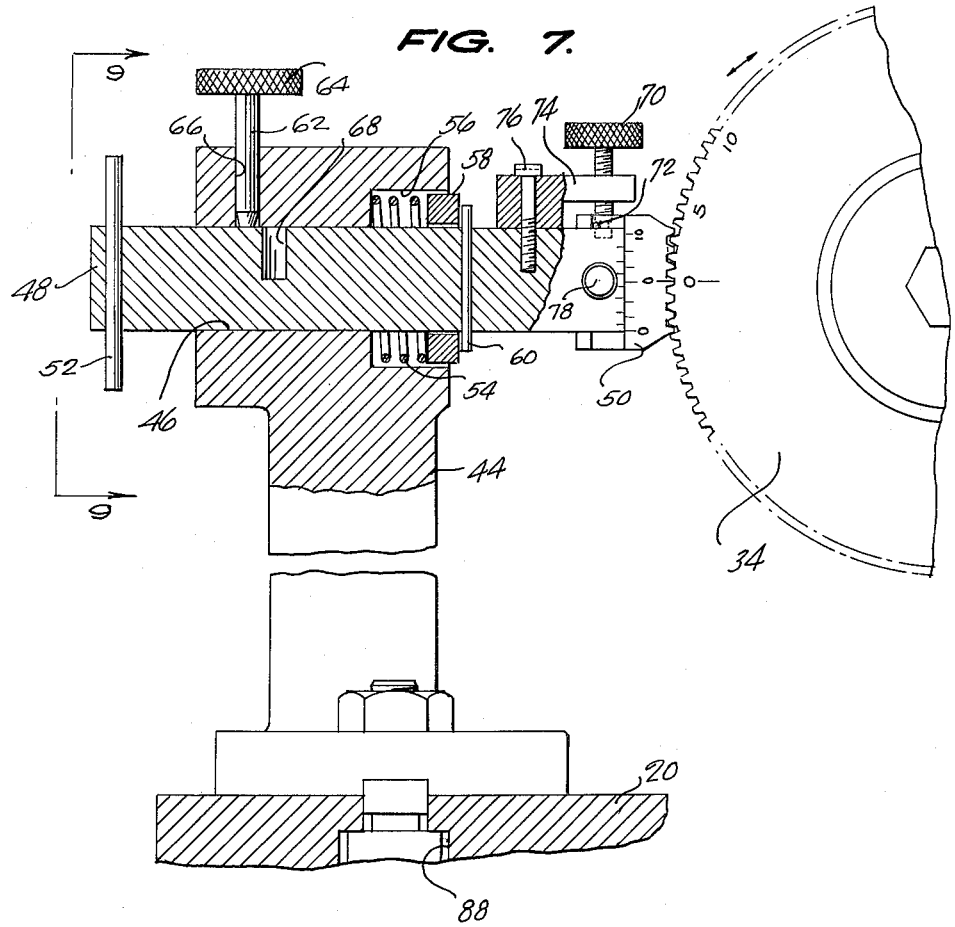
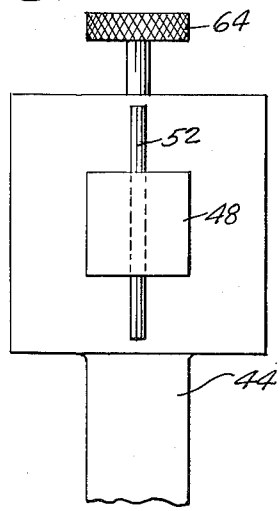
INVENTOR.
RUSSELL I. VAN HOUTEN,
BY
McMorrow, Berman + Davidson
ATTORNEYS.

United States Patent Office 3,017,703
Patented Jan. 23, 1962

3,017,703
MEASURING HELICAL LEADS
Russell I. Van Houten, Ormond Beach, Fla.
(3920 S. Congress, Lake Worth, Fla.)
Filed Aug. 27, 1959, Ser. No. 836,441
9 Claims. (Cl. 33—199)

The present invention relates to an apparatus for measuring the leads of a helix in a workpiece, or the lead of any thread, helical groove or ridge, cam surface, or the like in any workpiece.

An object of the present invention is to provide a lead measuring apparatus which lends itself to rapid and accurate measuring of the lead of a helix of any pitch.

Another object of the present invention is to provide a lead measuring apparatus for measuring the lead of a helix on a workpiece which is adaptable to receive and support workpieces of all shapes and sizes.

A further object of the present invention is to provide a lead measuring apparatus for measuring the lead of a helix on a workpiece which is extremely accurate in operation, one which is foolproof in operation, one which is simple in structure and readily manufactured in quantity at reasonable cost, and one which is highly effective in action.

These and other objects and advantages of the present invention will be fully apparent from the following description when taken in conjunction with the annexed drawings, in which:

FIGURE 1 is a top plan view of the apparatus of the present invention, showing a workpiece in position thereon for measuring the lead of a helix on the workpiece;

FIGURE 2 is a front elevational view of the apparatus, as shown in FIGURE 1;

FIGURE 3 is an elevational view of the apparatus as viewed from one end;

FIGURE 4 is an elevational view of the apparatus as viewed from the other end, the base being shown in section;

FIGURE 5 is a view taken on the line 5—5 of FIGURE 4;

FIGURE 6 is a view taken on the line 6—6 of FIGURE 5, and on an enlarged scale;

FIGURE 6A is a perspective view of the stylus portion of the apparatus, shown removed from the supporting structure shown in FIGURE 6;

FIGURE 7 is a detailed elevational view partially in section of the portion of the apparatus shown in FIGURE 3;

FIGURE 8 is a perspective view of the rack element removed from its supporting bar;

FIGURE 9 is a view taken on the line 9—9 of FIGURE 7;

FIGURE 10 is an elevational view partially in section of a modified form of the rack element of the apparatus of the present invention; and FIGURE 11 is a view taken on the line 11—11 of FIGURE 10.

Referring in detail to the drawings in which like numerals indicate like parts throughout the several views, the apparatus of the present invention comprises a flat base 20 adapted for support on a work bench or other supporting means. A live headstock 22 is adjustably supported on the base 20 in a first dovetailed groove 24.

A tailstock 26 is positioned in longitudinal aligned relation with respect to the headstock 22 and is also adjustably mounted in the groove 24. The tailstock 26 includes a hand wheel 28 for manually advancing and retracting the dead center 30 thereof.

The headstock 22 includes a live center 32 rotatably mounted in a bearing assembly (not shown) and carrying a spur gear 34 for rotation therewith.

A dog 36, detachably mounted upon one end of a work support piece 38, connects the live center 32 to the piece 38 for rotation together.

A test piece 40, having a helical groove 42, is fixedly secured on the piece 38 for rotation with the latter.

A standard 44 rises from the base 20 adjacent the perimeter of the spur wheel 34. The upper end portion of the standard 44 is provided with a square bore 46 in which is slidably mounted a square bar 48 movable toward and away from the perimeter of the spur gear 34 and having one end adjacent the perimeter of the spur gear 34 and carrying thereon a toothed rack element 50 constituting a setting and gauging means.

The rack element 50 is intermeshingly engageable with the teeth of the spur gear 34 responsive to sliding movement of the bar 48 for the perimeter of the spur gear 34.

Hand actuable means is provided on the end of the bar 48 remote from the rack element 50 for grasping by the hand of the user so as to effect the sliding movement of the bar 48 away from the perimeter of the spur gear 34. This hand actuable means consists in a vertically disposed rod 52 extending through the bar 48 inwardly of and adjacent the end of the latter remote from the spur gear 34.

Spring means is provided operatively connected to the bar 48 for urging the latter toward the perimeter of the spur gear 34. Specifically, as shown in FIGURE 7 this spring means consists in a coil spring 54 circumposed about a midportion of the bar 48 and disposed within a relatively large counterbore opening inwardly of the one end of the standard 44 adjacent the spur gear 34, as at 56. One end of the spring 54 bears against the end of the counterbore 56 and the other end bears against a washer 58 which is held in position on the bar 48 by means of a pin 60 extending through the bar 48.

The present invention provides a locking element carried by the standard 44 and releasably engageable with means provided on the bar 48 for holding the rack element away from the spur gear 34. Specifically, as shown in FIGURE 7, this locking element consists in a pin 62 having a head 64 on the upper end thereof, the pin 62 being slidable in a vertical bore 66 extending inwardly from the upper end of the standard 44 and terminating at the bore 46. The bar 48 is provided with a vertical bore 68 extending inwardly from the upper side thereof and terminating at a midpart of the bar 48. The bore 68 is registrable with the bore 66 when the bar 48 has been pulled outwardly against the compression of the spring 54.

The rack element 50 is mounted in the end of the bar 48 for vertical upward and downward movement responsive to turning of a thumb screw 70. The shank of the thumb screw 70 is anchored by a pin 72 in the upper end of the rack element 50. The shank of the thumb screw 70 is mounted in a threaded bore in the long leg of an L-shape bracket 74 secured by a bolt 76 to the upper face of the bar 48, as shown most clearly in FIGURE 7. A clamping screw 78 extends through a bore provided in the bar 48 and through a slot 80 provided in the rack element 50 and serves to hold the rack element 50 in any position of its adjusted upward or downward movement as moved by rotation of the thumb screw 70.

A carriage 82 is mounted on the base 20 for limited linear movement parallel to the work support piece 38. A stylus 84 is mounted on the carriage 82 for movement into and out of engagement in the groove 42 in the test piece 40 and for movement, with the carriage 82, parallel to the work support piece 38.

The carriage 82 is mounted on the upper end of a standard 86 which has its lower end slidably mounted in the same groove 88 in which the standard 44 is slidably mounted.

As shown most clearly in FIGURE 6, the upper end of the standard 86 carries a trackway element 90 on which the carriage 82 is slidably mounted for limited back and forth movement between stops 92 on the ends of the trackway element 90. The stops are shown most clearly in FIGURE 5.

The stylus 84 is removably mounted on the carriage 82 by means of a spring-biased plunger 94 carried by the carriage 82 and having a threaded bore in one end receiving the shank of the stylus 84, as at 96 in FIGURE 6.

A lock screw 98 secures the standard 86 in any position of its forward movement forwardly or rearwardly on the base 20 so as to position the stylus 84 adjacent the test piece 40 and in engagement in the groove 42 therein.

In order to provide free sliding movement of the carriage 82 relative to the trackway element 90, ball bearings 100 are provided and interposed between the carriage 82 and the trackway element 90, as shown most clearly in FIGURE 6.

Gauge means is provided on the standard 86 for cooperating with the stylus 84 to measure the linear movement of the stylus 84 on a helical thread or the like to be gauged.

Specifically, this gauge means consists in an L-shaped support member 102 having its long leg horizontally disposed and fixedly mounted on the standard 86 and having its short leg projecting vertically and spaced from the carriage 82.

A commercially available indicator gauge, as at 104 in FIGURES 2 and 5, is mounted on the carriage 82 and has its feeler element 106 engageable with a gauge block 108 when the latter is positioned on the support member 102 adjacent the short leg of the latter, as shown in dotted lines in FIGURE 5.

With reference to FIGURES 10 and 11, a modified form of the setting engaging means is shown in which the bar 48' carries at one end a rack element 50' mounted for up and down movement on the bar 48' and carried by the free end of a micrometer spindle 110 having an operating cylinder or handle 112. The body 114 of the micrometer is carried by a bracket 74' which is secured by a bolt 76 to the adjacent portion of the bar 48'.

In operation, the base 20 is supported upon a work bench or other support means and the test piece 40 is either formed integrally with the work support or work support piece 38 or is mounted thereon for the purpose of measuring the pitch of the groove 42. The standard 86 is shifted toward and away from the test piece 40 and the carriage 82 moved to one end of the trackway element 90 so that the stylus 84 may be positioned at one end of the helical groove 42 or thread to be gauged.

Obviously, many forms of stylus 84 may be provided with the apparatus of the present invention, one to fit any particular type of thread or groove to be gauged.

Next, the hand actuable rod 52 is pulled backwardly, causing the bar 48 to be moved backwardly and the rack element 50 to be disengaged from meshing engagement with the teeth of the spur gear 34, the bar being moved backwardly until the pin 62 is in alignment with and drops into the bore 68, thereby holding the rack element 50 out of meshing engagement with the teeth of the spur gear 34. At this point, the gear 34 is turned so that a known tooth mark, such as "O" as in FIGURE 7 is opposite a similar identifying indicium on the side of the element 50. Upon conclusion of this setting the pin 62 is withdrawn from the bore 68, permitting the bar 48 under the action of the spring 54 to return the rack element 50 into meshing engagement with the teeth of the spur gear 34.

Next, either the standard 86 or the carriage 82 is shifted so as to bring the feeler element 106 of the indicating gauge 104 into zero abutting relation with respect to the short leg of the support member 102.

The next operating step consists in again pulling backwardly on the bar 48 so as to disengage the rack from the teeth of the spur gear 34 and by hand rotating either the gear 34 or the test piece either a portion of a turn or one or more turns, depending upon the pitch of the helical groove to be measured.

If only a portion of a turn is to be executed by the test piece, this may be measured by the number of teeth which are moved relative to the tooth rack or element 50. Obviously, the number of teeth on the spur gear 34 must be predetermined and known to the user of the apparatus of the present invention.

After the test piece has been rotated and the stylus carried along the groove 42, the distance that it travels is determined by inserting one or more gauge blocks 108 on the support member 102 and bringing the feeler element 106 into abutting engagement and reading on the dial of the gauge 104 the distance of movement of the feeler element 106 which, when added to the known thicknesses of the gauge blocks 108, gives the length of travel of the stylus 84 for the proportionate part of a revolution of the gear 34. From these measurements may be obtained, mathematically, the pitch of the groove 42.

An alternative way to rotate the test piece 40 is to leave the element 50 in mesh with the teeth of the spur gear 34 and to turn the thumb screw 70 to raise the rack element 50 a known distance as determined by the vernier indicia on the side of the element 50 on the adjacent part of the bar 48.

An additional means for shifting the spur gear 34 resides in the provision of the micrometer in FIGURES 10 and 11 operatively connected to the rack element 50' and operable to rotate the spur gear 34 at a desired predetermined distance within exceedingly close limits as determined by the movement of the cylinder or handle 112 on the body 114 of the micrometer. The use of the micrometer will be fully understood by one skilled in the machinist art for which the apparatus of the present invention is intended for use.

What is claimed as new is as follows:

1. In a lead measuring apparatus, a base, a spur gear rotatably supported on said base, a setting and gauging means adjacent said gear and mounted on said base for movement toward and away from said spur gear, said means including a vertically movable toothed rack element intermeshingly engageable with the teeth of said spur gear responsive to movement of said setting and gauging means toward said spur gear, hand actuable means operatively connected to said rack element and operable, when the toothed rack element is in intermeshing engagement with the teeth of said spur gear, to effect vertical movement of said toothed rack element and thereby cause corresponding rotary movement of said spur gear, and a stylus mounted on said base for longitudinal movement therealong.

2. In a lead measuring apparatus, a base, a spur gear rotatably supported on said base, a setting and gauging means adjacent said gear and mounted on said base for movement toward and away from said spur gear, said means including a vertically movable toothed rack element intermeshingly engageable with the teeth of said spur gear responsive to movement of said setting and gauging means toward said spur gear, hand actuable means operatively connected to said rack element and operable, when the toothed rack element is in intermeshing engagement with the teeth of said spur gear, to effect vertical movement of said toothed rack element and thereby cause corresponding rotary movement of said spur gear, a stylus mounted on said base for longitudinal movement therealong, and indicator means operatively connected to said stylus and base for measuring the distance of travel of said stylus.

3. In a lead measuring apparatus, a base, a spur gear rotatably supported on said base, a setting and gauging means adjacent said gear and mounted on said base for movement toward and away from said spur gear, said means including a vertically movable toothed rack element intermeshingly engageable with the teeth of said spur gear responsive to movement of said setting and gauging means toward said spur gear, hand actuable means operatively connected to said rack element and operable, when the toothed rack element is in intermeshing engagement with the teeth of said spur gear, to effect vertical movement of said toothed rack element and thereby cause corresponding rotary movement of said spur gear, a stylus mounted on said base for longitudinal movement therealong, indicator means operatively connected to said stylus and base for measuring the distance of travel of said stylus, and another indicator means operatively connected to said rack element for measuring the degree of rotation of said spur gear.

4. A lead measuring apparatus comprising a base, a headstock on said base, a spur gear rotatably carried by said headstock, a standard rising from said base and located adjacent the perimeter of said spur gear, a bar supported in said standard for sliding movement toward and away from the perimeter of said spur gear and having one end adjacent the perimeter of said spur gear and having the other end on the side of said standard remote from the perimeter of said spur gear, a toothed rack element on said one end of said bar intermeshingly engageable with said spur gear responsive to sliding movement of said bar toward the perimeter of said spur gear, hand actuable means on the other end of said bar for effecting the sliding movement of said bar away from the perimeter of said spur gear, means mounting said rack element on said bar for limited vertical movement, hand actuable means operatively connected to said rack element and operable, when the toothed rack element is in intermeshing engagement with the teeth of said spur gear, to effect vertical movement of said toothed rack element and thereby cause corresponding rotary movement of said spur gear, a tailstock on said base and in linear alignment with said headstock, a work support extending between and supported in said headstock and tailstock for rotation with said spur gear, a carriage mounted on said base for limited linear movement parallel to said work support, and a stylus mounted on said carriage for movement therewith.

5. A lead measuring apparatus comprising a base, a headstock on said base, a spur gear rotatably carried by said headstock, a setting and gauging intermeshable element adjacent said headstock and mounted on said base for movement into and out of intermeshing engagement with said spur gear, a tailstock on said base and in linear alignment with said headstock, a work support extending between and supported in said headstock and tailstock for rotation with said spur gear, a carriage mounted on said base for limited linear movement parallel to said work support, and a stylus mounted on said carriage for movement with the latter.

6. A lead measuring apparatus comprising a base, a headstock on said base, a spur gear rotatably carried by said headstock, a setting and gauging intermeshable element adjacent said headstock and mounted on said base for movement into and out of intermeshing engagement with said spur gear, spring means operatively connected to said gauging element for urging the latter into intermeshing engagement with said spur gear, a tailstock on said base and in linear alignment with said headstock, a work support extending between and supported in said headstock and tailstock for rotation with said spur gear, a carriage mounted on said base for limited linear movement parallel to said work support, and a stylus mounted on said carriage for movement with the latter.

7. A lead measuring apparatus comprising a base, a headstock on said base, a spur gear rotatably carried by said headstock, a standard rising from said base and located adjacent the perimeter of said spur gear, a bar supported in said standard for sliding movement toward and away from the perimeter of said spur gear and having one end adjacent the perimeter of said spur gear and having the other end on the side of said standard remote from the perimeter of said spur gear, a toothed rack element on said one end of said bar intermeshingly engageable with said spur gear responsive to sliding movement of said bar toward the perimeter of said spur gear, hand actuable means on the other end of said bar for effecting the sliding movement of said bar away from the perimeter of said spur gear, means mounting said rack element on said bar for limited vertical movement, hand actuable means operatively connected to said rack element and operable, when the toothed rack element is in intermeshing engagement with the teeth of said spur gear, to effect vertical movement of said toothed rack element and thereby cause corresponding rotary movement of said spur gear, a tailstock on said base and in linear alignment with said headstock, a work support extending between and supported in said headstock and tailstock for rotation with said spur gear, a carriage mounted on said base for limited linear movement parallel to said work support, and a stylus mounted on said carriage for movement with the latter.

8. A lead measuring apparatus comprising a base, a headstock on said base, a spur gear rotatably carried by said headstock, a standard rising from said base and located adjacent the perimeter of said spur gear, a bar supported in said standard for sliding movement toward and away from the perimeter of said spur gear and having one end adjacent the perimeter of said spur gear and having the other end on the side of said standard remote from the perimeter of said spur gear, a toothed rack element on said one end of said bar intermeshingly engageable with said spur gear responsive to sliding movement of said bar toward the perimeter of said spur gear, hand actuable means on the other end of said bar for effecting the sliding movement of said bar away from the perimeter of said spur gear, means mounting said rack element on said bar for limited vertical movement, hand actuable means operatively connected to said rack element and operable when the toothed rack element is in intermeshing engagement with the teeth of said spur gear, to effect vertical movement of said toothed rack element and thereby causing corresponding rotary movement of said spur gear, spring means operatively connected to said bar for urging the latter toward the perimeter of said spur gear, a tailstock on said base and in linear alignment with said headstock, a work support extending between and supported in said headstock and tailstock for rotation with said spur gear, a carriage mounted on said base for limited linear movement parallel to said work support, and a stylus mounted on said carriage for movement with the latter.

9. A lead measuring apparatus comprising a base, a headstock on said base, a spur gear rotatably carried by said headstock, a standard rising from said base and located adjacent the perimeter of said spur gear, a bar supported in said standard for sliding movement toward and away from the perimeter of said spur gear and having one end adjacent the perimeter of said spur gear and having the other end on the side of said standard remote from the perimeter of said spur gear, a toothed rack element on said one end of said bar intermeshingly engageable with said spur gear responsive to sliding movement of said bar toward the perimeter of said spur gear, hand actuable means on the other end of said bar for effecting the sliding movement of said bar away from the perimeter of said spur gear, means mounting said rack element on said bar for limited vertical movement, hand actuable means operatively connected to said rack element and operable, when the toothed rack element is in intermeshing engagement with the teeth of said spur gear, to effect vertical movement of said toothed rack element and thereby causing corresponding rotary movement of said spur gear, spring means operatively connected to said bar for urging the latter toward the perimeter of said spur gear, a locking element carried by said standard and releasably engageable with means provided on said bar for holding the rack element out of intermeshing engagement with said spur gear, a tailstock on said base and in linear alignment with said headstock, a work support extending between and supported in said headstock and tailstock for rotation with said spur gear, a carriage mounted on said base for limited linear movement parallel to said work support, and a stylus mounted on said carriage for movement with the latter.

References Cited in the file of this patent

UNITED STATES PATENTS

| | | |
|---|---|---|
| 1,307,347 | Cumner et al. | June 24, 1919 |
| 1,667,109 | Garlent | Apr. 24, 1928 |
| 1,956,812 | Smith | May 1, 1934 |
| 2,829,442 | Peickii | Apr. 8, 1958 |